(12) United States Patent
Hegde

(10) Patent No.: US 10,182,301 B2
(45) Date of Patent: Jan. 15, 2019

(54) SYSTEM AND METHOD FOR WIRELESS MICROPHONE TRANSMITTER TRACKING USING A PLURALITY OF ANTENNAS

(71) Applicant: Harman International Industries, Inc., Stamford, CT (US)

(72) Inventor: Krishna Rama Hegde, Karnataka (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/051,958

(22) Filed: Feb. 24, 2016

(65) Prior Publication Data

US 2017/0245078 A1   Aug. 24, 2017

(51) Int. Cl.
| H04R 29/00 | (2006.01) |
| H04R 3/00 | (2006.01) |
| H04W 4/02 | (2018.01) |
| H04W 24/08 | (2009.01) |
| H04W 4/029 | (2018.01) |
| H04R 1/40 | (2006.01) |
| H04R 1/34 | (2006.01) |

(52) U.S. Cl.
CPC ......... H04R 29/005 (2013.01); H04R 29/007 (2013.01); H04W 4/027 (2013.01); H04W 4/029 (2018.02); H04W 24/08 (2013.01); H04R 1/342 (2013.01); H04R 1/406 (2013.01); H04R 3/005 (2013.01); H04R 2420/07 (2013.01)

(58) Field of Classification Search
CPC .......... H04R 1/342; H04R 1/38; H04R 1/406; H04R 3/00; H04R 3/002; H04R 3/005; H04R 3/04; H04R 2201/401; H04R 2201/403

USPC .............. 381/91, 92, 122, 58, 95, 111, 113; 343/703

See application file for complete search history.

(56) References Cited

U.S. PATENT DOCUMENTS

| 8,229,699 B2 * | 7/2012 | Jin ........................ G01S 5/0289 370/254 |
| 2011/0255708 A1 * | 10/2011 | Crowley .................. H01Q 1/40 381/77 |
| 2012/0052827 A1 * | 3/2012 | Sadek .................. H04B 7/0808 455/226.1 |

(Continued)

FOREIGN PATENT DOCUMENTS

EP   1562257 A1   8/2005

OTHER PUBLICATIONS

Sigismondi et al., "Wireless Systems Guide for Antenna Setup", Shure Legendary Performance, 2008, 19 pages.

*Primary Examiner* — Xu Mei

(74) *Attorney, Agent, or Firm* — Brooks Kushman P.C.

(57) ABSTRACT

In at least one embodiment, a system for monitoring movement of a wireless microphone that transmits an audio signal on a stage is provided. The system includes a plurality of antennas for being positioned on stage and each being positioned on a different zone of the stage and each being configured to wirelessly receive an audio signal from a wireless microphone. The system further includes a controller that is operably coupled to each antenna. The controller is configured to determine the signal strength for the audio signal received at each antenna at least two or more times and to determine a signal strength trend for each antenna in response to determining the signal strength for the audio signal at each antenna at least two or more times.

18 Claims, 4 Drawing Sheets

(56) References Cited

U.S. PATENT DOCUMENTS

2013/0101134 A1* 4/2013 Betts-Lacroix ........... H04S 7/30
 381/80

* cited by examiner

«SYSTEM AND METHOD FOR WIRELESS MICROPHONE TRANSMITTER TRACKING USING A PLURALITY OF ANTENNAS»

TECHNICAL FIELD

Aspects disclosed herein generally relate to a system and method for tracking a wireless microphone transmitter using a plurality of antennas.

BACKGROUND

EP 1562257 to Uno provides, among other things, a wireless mobile communication system that is provided with a first terminal and a mobile terminal. Whereby the first terminal and the mobile terminal each have transceiving means for sending and receiving an information carrying signal wave and whereby the transceiving means of at least the first terminal or the mobile terminal is equipped with a controllable directional signal wave converter for a direction sensitive transmission and reception of an information carrying signal wave. The wireless mobile communication system further comprises a movement monitoring means for monitoring a movement of the mobile terminal relative to the first terminal. The wireless mobile communication system further comprises a direction adjustment means for adjusting the directional characteristic of the controllable directional signal wave converter in accordance to the movement of the mobile terminal relative to the first terminal as monitored by the movement monitoring means.

SUMMARY

In at least one embodiment, a system for monitoring movement of a wireless microphone that transmits an audio signal on a stage is provided. The system includes a plurality of antennas for being positioned on stage and each being positioned on a different zone of the stage and each being configured to wirelessly receive an audio signal from a wireless microphone. The system further includes a controller that is operably coupled to each antenna. The controller is configured to determine the signal strength for the audio signal received at each antenna at least two or more times and to determine a signal strength trend for each antenna in response to determining the signal strength for the audio signal at each antenna at least two or more times.

In at least one embodiment, a method for monitoring movement of a wireless microphone that transmits an audio signal on a stage is provided. The method includes wirelessly receiving, at a plurality of antennas on a stage, an audio signal from a microphone and determining the signal strength the audio signal received at each antenna at least two or more times. The method further includes determining, via a controller, a signal strength trend for each antenna in response to determining the signal strength for the audio signal at each antenna at least two or more times.

In at least one embodiment, a computer-program product embodied in a non-transitory computer read-able medium that is programmed to monitor movement of a wireless microphone that transmits an audio signal on a stage is provided. The computer-program product includes instructions to determine a signal strength for an audio signal received at each of a plurality of antennas from a microphone on a stage and to determine a signal strength trend for each antenna at least two or more times in response to determining the signal strength for the audio signal at each antenna at least two or more times.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
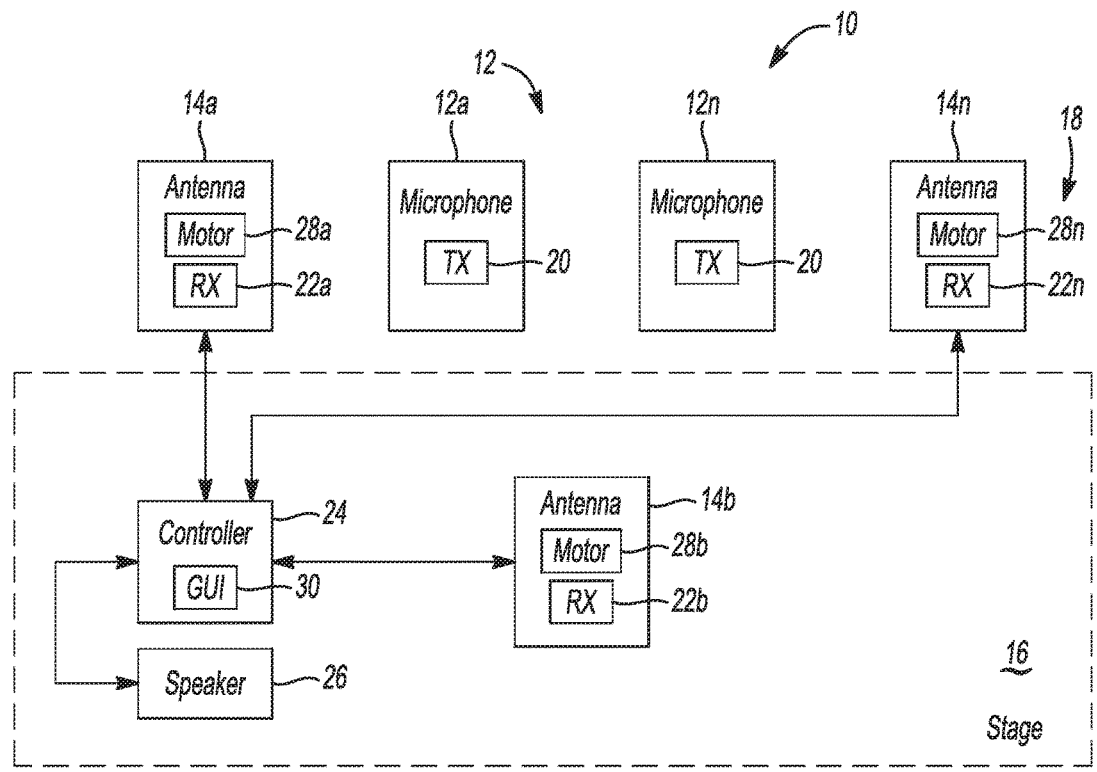
FIG. 1 depicts a system for wireless microphone transmitter tracking in accordance to one embodiment.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices ((e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

Microphones are commonly used in connection with one or more speakers. The microphone may wirelessly transmit an audio signal to any number of antennas positioned between the microphone and the speaker. The wireless microphone, the antennas, and the speakers may be used in connection with a concert tour venue, a stadium and larger performance theaters. The transmission of the audio signal from the microphone to the antenna is unidirectional for the foregoing case use examples. In general, for a professional audio wireless microphone setup in an indoor or outdoor venue, the placement of various antennas in relation to one or more wireless microphones that transmit audio signals may be a challenge since the microphone is not a stationary device and the microphone is prone to movement as a singer, actor, or speaker moves about a stage. It is desirable to ensure that at least one antenna positioned on a stage exhibits adequate reception of the audio signal from the wireless microphone to guarantee audio playback.

Aspects disclosed herein provide, amount other things, a system that tracks the location of at least one wireless microphone within the venue in relation to a plurality of antennas. A controller is operably connected to the plurality of antennas and determines the location of the wireless microphone based on signal strength of the audio signal from the microphone as received at each corresponding antenna. Based on the location of the at least one wireless microphone, the controller controls at least one antenna to rotate horizontally on a stage to ensure that at least one antenna from the plurality of antennas is adequately orientated to properly receive the audio signal from the at least one wireless microphone. It is further recognized that the controller may also control the at least one antenna to rotate horizontally to properly receive the audio signals from a plurality of microphones that are active at the same time as one another. The controller is configured to determine the location of each of the microphones and to control the horizontal orientation of at least one antenna to ensure proper receipt from all active microphones in the venue.

FIG. 1 depicts a system 10 for tracking at least one wireless microphone 12 (or 12a-12n) in accordance to one embodiment. The system 10 generally includes a first wireless microphone 12a and/or a second wireless microphone 12n. A plurality of antennas 14a-14n receive an audio signal from each microphone 12. One or more of the plurality of antennas 14a-14n may be positioned on or about a stage 16 in a venue 18. The venue 18 may be an establishment that can handle a large concert, a stadium or large performance theater, etc. Each microphone 12 includes a transmitter 20 for transmitting the audio signal to the plurality of antennas 14a-14n in a frequency range of 450-900 Hz. Each antenna 14 includes a receiver 22 for receiving the audio signal in the frequency range 450-900 MHz from the microphones 12.

A controller 24 is electrically connected to each antenna 14 for receiving the audio signal therefrom. In one example, the controller 24 may be connected to each antenna 14 via radio frequency (RF) cables. At least one speaker 26 is electrically connected to the controller 24. An audio mixer (not shown) may be optionally positioned between the controller 24 and the at least one speaker 26. The controller 24 processes the audio signal as received from the antennas 14 and provides a processed signal to the speaker 26. The speaker 26 receives the processed signal from the controller 24 to playback an audio input provided to the microphone 12 from a user (not shown). In general, the antenna 14 outputs a signal indicative of the audio signal as received from the microphone 12. Each antenna 14 measures a signal strength of the audio signal as received from the microphone 12 and provides an output indicative of the signal strength to the controller 24. The controller 24 determines the signal strength for each antenna 14 in response to the output.

Each antenna 14 is implemented as a unidirectional antenna in which the propagation (or transmission) pattern from the microphone 12 is in one direction. Thus, it is desirable to locate the microphones 12 in the system 10 and to rotate a corresponding antenna 14 horizontally above a surface of the stage 16 to receive the audio signal from the microphone 12 with a proper propagation pattern (or beam pattern) from the microphone 12. In this regard, each antenna 14a-14n includes a motor 28a-28n, respectively, for horizontally changing the orientation of the antenna 14 based on the location of the microphone 12.

In general, the plurality of antennas 14a-14n is positioned near or around the stage 16 such that the antennas 14a-14n cover a maximum area of the stage 16 (or performance area). Each antenna 14 may have a typical beam width of generally 70 degrees or more that extends horizontally above a surface of the stage 16 to adequately receive the audio signal from the microphone(s) 12. Each antenna 14 may be positioned or mounted on a stand (not shown) that is positioned at a predetermined height off of the ground based on the desired sound and/or venue application. Each antenna 14 is configured to horizontally rotate about the stand based on at least one control signal transmitted from the controller 24. As noted above, the controller 24 determines the signal strength of each audio signal received at the antennas 14 and controls the horizontal rotation of at least one corresponding antenna from the plurality of antennas 14 to ensure that at least one antenna is properly orientated to receive the audio signal from the microphone 12 to enable playback at the speaker 26.

Figure 2:
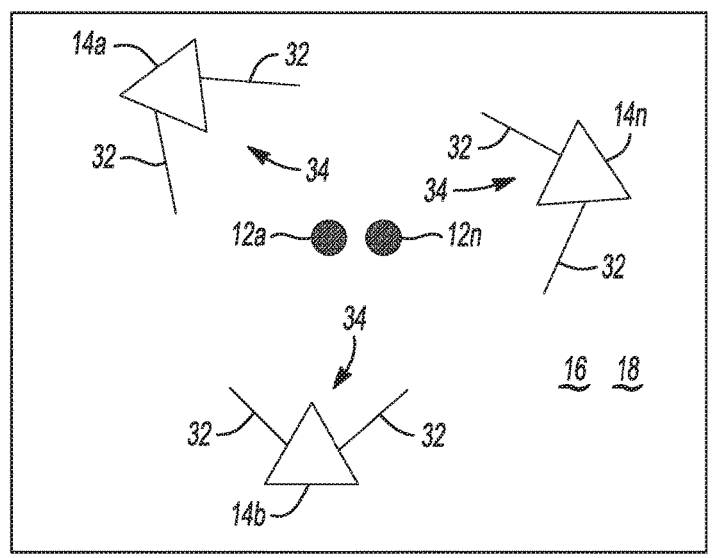
FIG. 2 depicts a portion of the system in a horizontal plane in accordance to one embodiment.

The controller 24 includes a graphical user interface (GUI) 30 to enable a user to initiate and execute a setup of the antenna(s) 14 at the stage 16 in reference to the microphone(s) 12. During the setup, the microphone(s) 12 may be placed at a center of the stage 16 or venue 18 as illustrated in FIG. 2. The user may select an "auto setup" command on the GUI 30 to initiate the antenna setup. It also recognized that any mobile device (e.g., cell phone, tablet, laptop, etc.) may be utilized to perform the auto setup as well. FIG. 2 depicts that the antennas 14 are orientated such that a maximum area of the stage 16 or the venue 18 is covered. This condition is exhibited by the triangular shape for each antenna 14 in each corner of the stage 16 or the venue 18 as shown in FIG. 2. The placement of each antenna 14 on the stage 16 or the venue 18 is such that the one antenna 14 can cover an edge 32 of a beam width 34 (or beam pattern) (e.g., the reception range of the audio signal at the antenna 14 from the microphone 12) for each remaining antenna 14 on the stage 16 (or the venue 18). In general, while FIG. 2 illustrates that the antenna 14 exhibits a triangular reception pattern, it is recognized that the antenna 14 may exhibit different reception patterns such as those exhibited by, for example, a directional wide-band antenna.

When the "auto setup" command is selected, the controller 24 controls the motor 28 for each antenna 14 such that the antenna 14 rotates horizontally 360 degrees (see FIG. 1). The controller 24 records the signal strength for each audio signal received at each antenna 14 while the microphone(s) 12 remain positioned at the center of the stage 16 or the venue 18. The controller 24 sets the initial direction (or the horizontal angle) of each antenna 14 to correspond to the maximum signal strength of the received audio signal from the microphone(s) 12 while positioned in the center of the stage 16 or the venue 18.

During setup, if any antenna 14 receives the audio signal from the microphone(s) 12 at a lower signal strength (or a predetermined signal strength threshold) than remaining antenna(s) 14, then the user may be required to manually adjust either the position of the microphone 12 or the horizontal angle of the antenna 14. The setup is complete once all of the antennas 14 used in the implementation exhibit adequate signal strength for each audio signal received from the microphone(s) 12. Once this condition is achieved, the controller 24 stores the desired horizontal angle (or default position) for each antenna 14.

Figure 3:
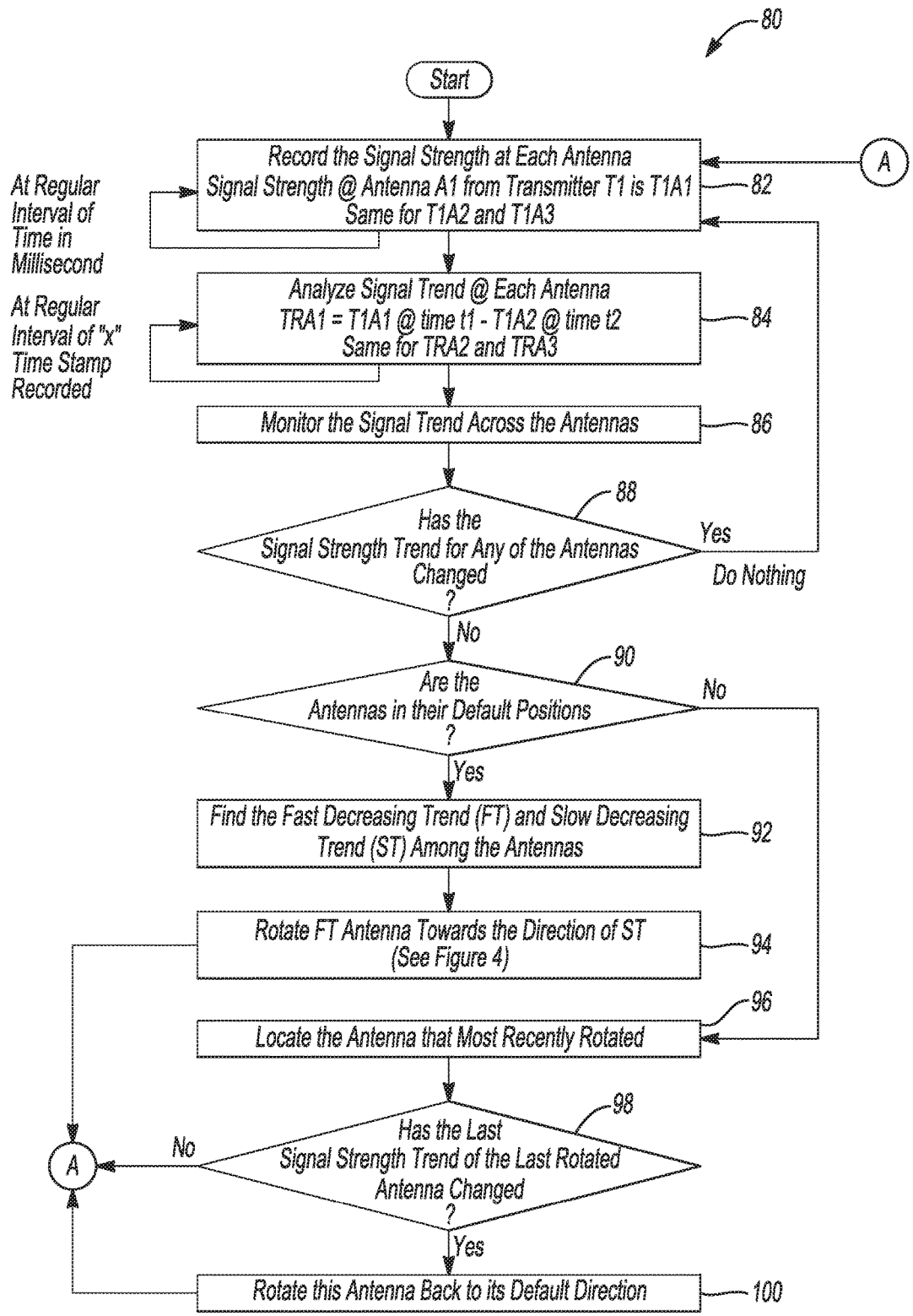
FIG. 3 depicts a method for performing wireless tracking for a single microphone in accordance to one embodiment.

FIG. 3 depicts a method 80 for performing wireless tracking for a single microphone 12 utilizing three antennas 14a, 14b, and 14c in accordance to one embodiment. While three antennas 14a-14c are discussed and shown in FIG. 3, it is recognized that any number of antennas 14 may be used. In general, the method 80 is executed after the auto setup as discussed above is performed.

In operation 82, the controller 24 determines and records the signal strength for each audio signal that is received at each antenna 14. The controller 24 performs this operation at regular time intervals in milliseconds or other suitable value.

In operation 84, the controller 24 analyzes the signal strength trend for each antenna 14. For example, the controller 24 stores a value corresponding to a signal strength trend (e.g., TRA1) for the antenna 14a that is defined by the following equation:

$$TRA1 = T1A1_{@time\ t1} - T1A1_{@time\ t2}$$

where $T1A1_{@time\ t1}$ corresponds to the determined signal strength at the antenna 14a at a time, t1 and $T1A1_{@time\ t2}$ corresponds to the determined signal strength at the antenna 14a at a time, t2. The signal strength trend for TRA1 may be determined at regular (or predetermined) time intervals over time. For example, T1A1 will be established based on new measurements of the signal strength at an initial time and at subsequent times thereafter. Therefore, at the next time interval, TRA1 is set to $T1A1_{@time\ t2} - T1A1_{@time\ t3}$ and so on.

The controller 24 also performs the same operation for the antenna 14b. For example, the controller 24 stores a value corresponding to a signal strength trend (e.g., TRA2) for the antenna 14b that is defined by the following equation:

$$TRA2 = T1A2_{@time\ t1} - T1A2_{@time\ t2}$$

where $T1A2_{@time\ t1}$ corresponds to the determined signal strength at the antenna 14b at a time t1 and $T1A2_{@time\ t2}$ corresponds to the determined signal strength at the antenna 14b at a time t2. The signal strength trend for TRA2 may be determined at regular time intervals over time. For example, TRA2 will be established based on new measurements of the signal strength at an initial time and at subsequent times thereafter. Therefore, at the next time interval, TRA2 is set to $T1A2_{@time\ t2} - T1A2_{@time\ t3}$ and so on.

The controller 24 also performs the same operation for the antenna 14c. For example, the controller 24 stores a value corresponding to a signal strength trend (e.g., TRA3) for the antenna 14c that is defined by the following equation:

$$TRA3 = T1A3_{@time\ t1} - T1A3_{@time\ t2}$$

where $T1A3_{@time\ t1}$ corresponds to the determined signal strength at the antenna 14c at a time t1 and $T1A3_{@time\ t3}$ corresponds to the determined signal strength at the antenna 14c at a time t2. The signal strength trend for TRA3 may be determined at regular time intervals over time. For example, TRA3 will be established based on new measurements of the signal strength at an initial time and at subsequent times thereafter. Therefore, at the next time interval, TRA3 is set to $T1A3_{@time\ t2} - T1A3_{@time\ t3}$ and so on.

In operation 86, the controller 24 monitors the signal strength trend for each antenna 14a-14c once a predetermined number of measurements have been ascertained for TRA1, TRA2, and TRA3.

In operation 88, the controller 24 determines whether there has been a change in the signal strength trend for any of the antennas 14a-14c. If the controller 24 determines that there has not been any change in the signal strength trend for any of the antennas 14a-14c, then the controller 24 does not move or rotate the antennas 14a-14c and the method 80 moves back to operation 82. If the controller 24 determines that there has been a change in the signal strength trend for any of the antennas 14a-14c, then the method 80 moves to operation 90.

In operation 90, the controller 24 determines whether each antenna 14a-14c is positioned in its corresponding default position as established during the antenna setup process as described above. If this condition is true, then the method 80 moves to operation 92. If not, then the method 80 moves to operation 96.

In operation 92, the controller 24 determines: (i) which of the antennas 14a-14c is exhibiting the fastest decreasing signal strength trend over time (i.e., FT) (or a maximum decreasing signal strength trend over time), (ii) which of the antennas 14a-14c is exhibiting the slowest decreasing signal strength trend (i.e., ST) (or a minimum decreasing signal strength trend over time), and (iii) which of the antennas is exhibiting an increasing trend (i.e., IT) or a decreasing trend (i.e., DT).

In operation 94, the controller 24 rotates the antenna 14a-14c that is exhibiting the fastest decreasing signal strength trend in a direction away from the antenna 14a-14c that is exhibiting the slowest decreasing signal strength. This aspect is discussed in reference to Table 1 as set forth below and in FIG. 4.

TABLE 1

| | Antenna 14a | Antenna 14b | Antenna 14c | Rotation |
|---|---|---|---|---|
| Condition 1 | FT | DT | ST | Controller 24 rotates antenna 14a to left side |
| Condition 2 | ST | FT | DT | Controller 24 rotates antenna 14b to left side |
| Condition 3 | DT | ST | FT | Controller 24 rotates antenna 14c to left side |
| Condition 4 | FT | ST | DT | Controller 24 rotates antenna 14a to right side |
| Condition 5 | DT | FT | ST | Controller 24 rotates antenna 14b to right side. |
| Condition 6 | ST | DT | FT | Controller 24 rotates antenna 14c to right side |

FT Fast Decreasing Trend
ST Slow Decreasing Trend
DT Decreasing Trend
IT Increasing Trend In reference to condition #1, the controller 24 determines that antenna 14a is exhibiting the fastest decreasing trend (FT), that antenna 14b is exhibiting a decreasing trend (DT), and that antenna 14c is exhibiting the slowest decreasing trend (ST). Therefore, the controller 24 controls the antenna 14a to move to a left side thereof (see FIG. 4) away from the antenna 14c.

In reference to condition #2, the controller 24 determines that antenna 14b is exhibiting the fastest decreasing trend (FT), that antenna 14c is exhibiting a decreasing trend (DT), and that antenna 14a is exhibiting the slowest decreasing trend (ST). Therefore, the controller 24 controls the antenna 14b to move to a left side thereof (see FIG. 4) away from the antenna 14a.

In reference to condition #3, the controller 24 determines that antenna 14c is exhibiting the fastest decreasing trend (FT), that antenna 14a is exhibiting a decreasing trend (DT), and that antenna 14b is exhibiting the slowest decreasing trend (ST). Therefore, the controller 24 controls the antenna 14c to move to a left side thereof (see FIG. 4) away from the antenna 14b.

In reference to condition #4, the controller 24 determines that antenna 14a is exhibiting the fastest decreasing trend (FT), that antenna 14c is exhibiting a decreasing trend (DT), and that antenna 14b is exhibiting the slowest decreasing trend (ST). Therefore, the controller 24 controls the antenna 14a to move to a right side thereof (see FIG. 4) away from the antenna 14b.

In reference to condition #5, the controller 24 determines that antenna 14b is exhibiting the fastest decreasing trend (FT), that antenna 14c is exhibiting a decreasing trend (DT), and that antenna 14c is exhibiting the slowest decreasing trend (ST). Therefore, the controller 24 controls the antenna 14b to move to a right side thereof (see FIG. 4) away from the antenna 14c.

In reference to condition #6, the controller 24 determines that antenna 14c is exhibiting the fastest decreasing trend (FT), that antenna 14b is exhibiting a decreasing trend (DT), and that antenna 14a is exhibiting the slowest decreasing trend (ST). Therefore, the controller 24 controls the antenna 14c to move to a right side thereof (see FIG. 4) away from the antenna 14a.

In general, the antenna 14 that is exhibiting the slowest decreasing signal trend is adequate to receive the audio signal from the microphone 12. As noted above, so long as only a single antenna 14 receives the audio signal from the microphone 12, it is not necessary to rotate the remaining antennas 14 toward the microphone 12. However, in the event an entertainer or public speaker with the microphone 12 moves rather quickly away from the antenna 14 that exhibits the slowest decreasing strength trend, it is possible that the microphone 12 may then move into the beam pattern 34 of the antenna 14 that exhibits the fastest decreasing signal strength trend given that such an antenna 14 is moved away from the antenna 14 that exhibits the slowest decreasing signal strength trend. Here, the antenna 14 that exhibits the fastest decreasing signal strength trend may be in a position to promptly and adequately receive the audio signal from the microphone 12 to account for the situation in which the microphone 12 rapidly moves away from the antenna 14 that formerly exhibited the slowest signal strength trend. This condition may increase the coverage and the reception time in which the antenna 14 that exhibits the fastest decreasing signal strength captures the signal from the microphone 12 during the movement of the entertainer or the public speaker back toward the antenna 14 that exhibited the fasted decreasing signal strength.

Referring back to FIG. 3, in operation 96, the controller 24 locates the antenna 14 that most recently rotated. In other words, the controller 24 determines which antenna 14 was the last antenna 14 controlled to rotate.

In operation 98, the controller 24 determines whether the last antenna 14 that was controlled to rotate is exhibiting a decreasing signal strength trend. If this condition is true, then the method 80 moves to operation 100. If not, then the method 80 moves to operation 82.

In operation 100, the controller 24 rotates the antenna 14 that was last detected to rotate back to its default location as established during the antenna setup process as described above.

Figure 4:
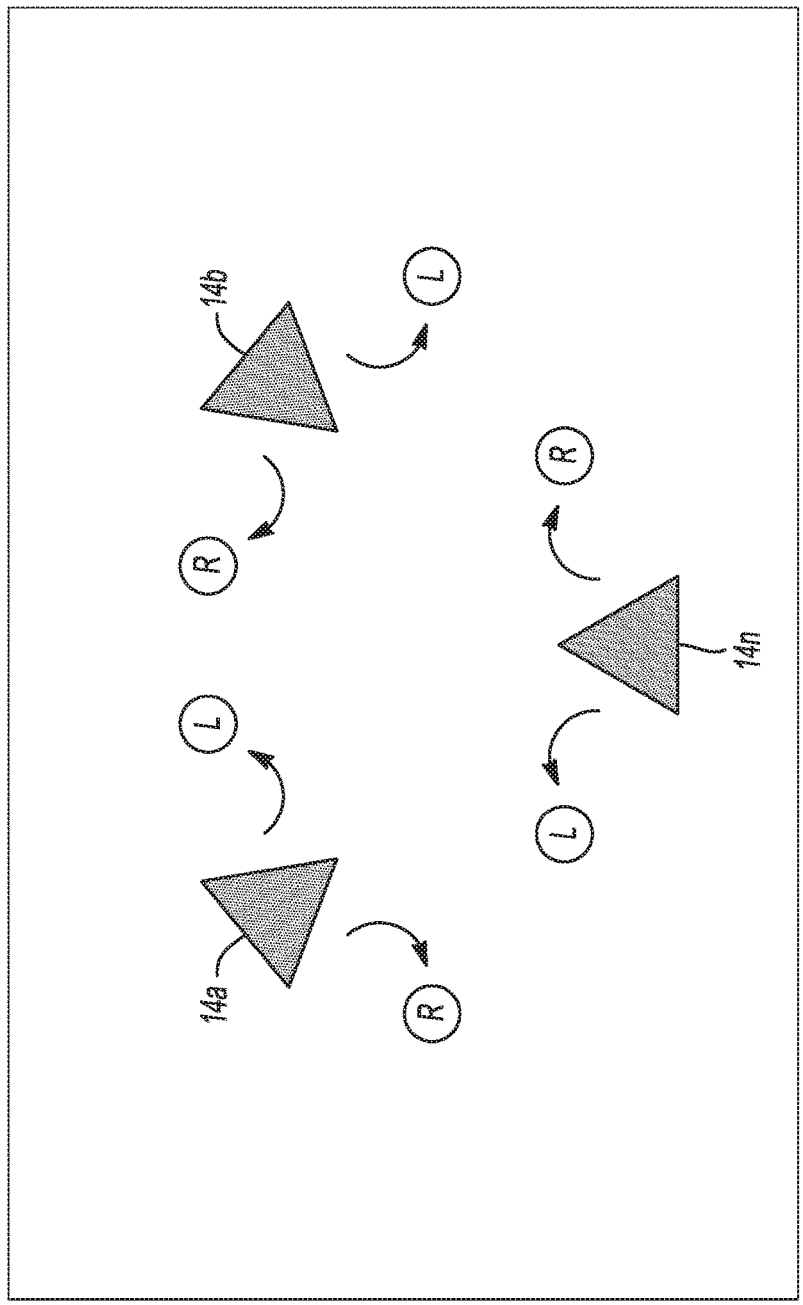
FIG. 4 depicts a movement of any of the corresponding antennas away from another antenna based on a fastest decreasing trend and a slowest decreasing trend in accordance to one embodiment.

FIG. 4 depicts a movement of any of the corresponding antennas 14 away from another antenna 14 based on a fastest decreasing trend and a slowest decreasing trend in accordance to one embodiment. This figure was discussed in more detail above.

Figure 5:
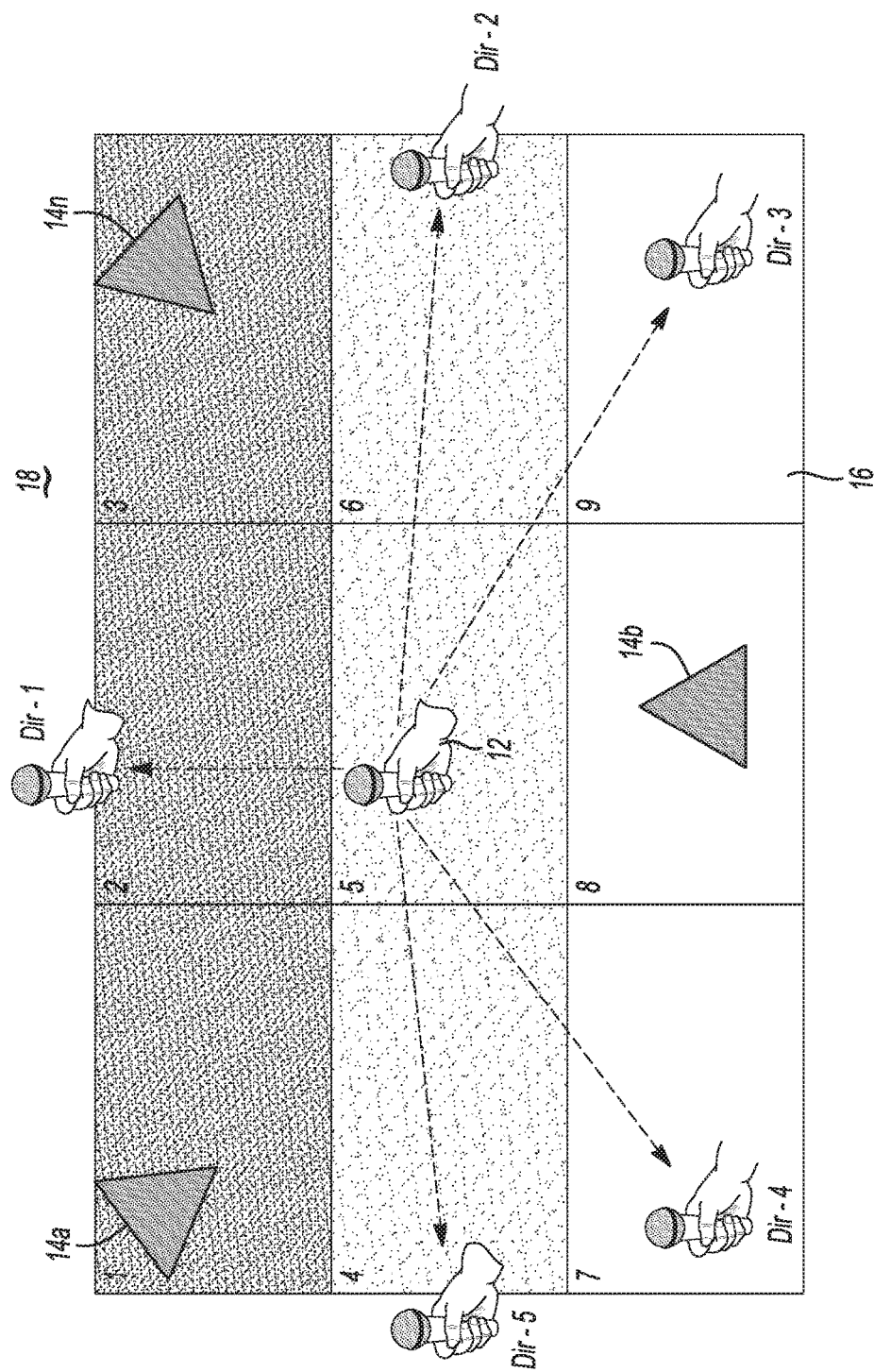
FIG. 5 depicts a movement of the single microphone in different locations about a stage in accordance to one embodiment.

FIG. 5 depicts the possible movement of the single microphone 12 in different zones, as labeled 1-9, of the stage 16 in accordance to one embodiment. The controller 24 may control any one of the antennas 14 to horizontally rotate based on the zone the microphone 12 is positioned in. It is recognized that only one or a single antenna 14 may be moved or rotated to receive the audio signal from the microphone 12 based on the location of the microphone 12 on the stage 16. For example, assume that the microphone 12 is located in zone 3, the controller 24 may control the antenna 14c to rotate toward the microphone 12 (or establish a beam direction with the microphone 12) to receive the audio signal therefrom. In this case, since the antenna 14c receives the audio signal at a signal strength that exceeds a signal strength threshold by a predetermined amount, the controller 24 may not need to control the remaining antennas 14a and 14b to rotate toward zone 3 given that the received signal strength of the audio signal from the microphone 12 at the antenna 14c exceeds the predetermined signal strength and the predetermined amount.

In the event the microphone 12 is located in zone 5, the controller 24 may rotate any two or more of the antennas 14 if such antennas 14 receive the audio signal at a signal strength that exceeds the signal strength threshold but does not exceed the predetermined amount to ensure that the audio signal is received by the antennas 14.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for monitoring movement of a wireless microphone that transmits an audio signal on a stage, the system comprising:
    a plurality of antennas for being positioned on stage and each being positioned on a different zone of the stage and each being configured to wirelessly receive an audio signal from the wireless microphone; and
    a controller for being electrically coupled to each antenna and being configured to determine a signal strength for the audio signal received at each antenna at least two or more times to provide a signal strength trend for each antenna,
    wherein the controller is further configured to store first information corresponding to which antenna of the plurality of antennas exhibits a maximum decreasing signal strength trend over time.

2. The system of claim 1 wherein the controller is further configured to provide the signal strength trend for each antenna at predetermined intervals.

3. The system of claim 1 wherein the controller is further configured to store second information corresponding to which of the antenna of the plurality of antennas exhibits a minimum decreasing signal strength trend over time.

4. The system of claim 3 wherein the controller is further configured to control a rotation of the antenna that exhibits the maximum decreasing signal strength trend away from the antenna that exhibits the minimum decreasing signal strength trend.

5. The system of claim 4 wherein the controller is further configured to control the antenna that exhibits the maximum decreasing signal strength trend horizontally away from the antenna that exhibits the minimum decreasing signal strength.

6. The system of claim 5 wherein each antenna includes a motor configured to rotate the antenna horizontally about the stage.

7. The system of claim 1 wherein the controller is further configured to control a rotation of only a single antenna of the plurality of antennas to rotate toward the wireless microphone.

8. A method for monitoring movement of a wireless microphone that transmits an audio signal on a stage, the method comprising:
  wirelessly receiving, at a plurality of antennas on a stage, an audio signal from the wireless microphone;
  determining, via a controller, a signal strength of the audio signal received at each antenna at least two or more times to provide a signal strength trend for each antenna; and
  storing second information corresponding to which antenna of the plurality of antennas exhibits a minimum decreasing signal strength trend over time.

9. The method of claim 8 wherein determining, via a controller, a signal strength of the audio signal received at each antenna at least two or more times to provide a signal strength trend for each antenna further comprises determining the signal strength trend for each antenna at predetermined intervals.

10. The method of claim 8 further comprising storing second information corresponding to which antenna of the plurality of antennas exhibits a minimum decreasing signal strength trend over time.

11. The method of claim 10 further comprising controlling a rotation of the antenna that exhibits the maximum decreasing signal strength trend away from the antenna that exhibits the minimum decreasing signal strength trend.

12. The method of claim 11 further comprising controlling the antenna that exhibits the maximum decreasing signal strength trend horizontally away from the antenna that exhibits the minimum decreasing signal strength.

13. A computer-program product embodied in a non-transitory compute read-able medium that is programmed to monitor movement of a wireless microphone that transmits an audio signal on a stage, the computer-program product comprising instructions to:
  determine a signal strength for an audio signal received at each of a plurality of antennas from the wireless microphone on a stage at least two or more times;
  provide a signal strength trend for each antenna by determining the signal strength for the audio signal at each of the plurality of antennas at least two or more times; and
  store second information corresponding to which antenna of the plurality of antennas exhibits a minimum decreasing signal strength trend over time.

14. The computer-program product of claim 13 further comprising instructions to provide the signal strength trend for each antenna at predetermined intervals.

15. The computer-program product of claim 13 further comprising instructions to store first information corresponding to which antenna of the plurality of antennas exhibits a maximum decreasing signal strength trend over time.

16. The computer-program product of claim 13 further comprising instructions to control a rotation of the antenna that exhibits the maximum decreasing signal strength trend away from the antenna that exhibits the minimum decreasing signal strength trend.

17. The computer-program product of claim 16 further comprising instructions to control the antenna that exhibits the maximum decreasing signal strength trend horizontally away from the antenna that exhibits the minimum decreasing signal strength trend.

18. A system for monitoring movement of a wireless microphone that transmits an audio signal on a stage, the system comprising:
  a plurality of antennas for being positioned on stage and each being positioned on a different zone of the stage and each being configured to wirelessly receive an audio signal from the wireless microphone; and
  a controller for being electrically coupled to each antenna and being configured to determine a signal strength for the audio signal received at each antenna at least two or more times to provide a signal strength trend for each antenna,
  wherein the controller is further configured to control a rotation of only a single antenna of the plurality of antennas to rotate toward the wireless microphone.

* * * * *